United States Patent [19]

Racine

[11] 4,200,070

[45] Apr. 29, 1980

[54] FUEL/AIR MIXTURE CONTROL FOR SUPERCHARGED INTERNAL COMBUSTION ENGINES

[76] Inventor: Gene A. Racine, 945 Novarro St., West Covina, Calif. 91791

[21] Appl. No.: 907,794

[22] Filed: May 19, 1978

[51] Int. Cl.² .............................................. F02M 31/00
[52] U.S. Cl. ....................... 123/122 AC; 123/122 AB; 123/119 C; 60/611; 60/605
[58] Field of Search ................... 123/119 C, 122 AC; 60/611, 605; 261/28, 145, 144

[56] References Cited

U.S. PATENT DOCUMENTS

| | | | |
|---|---|---|---|
| 1,430,792 | 10/1922 | Brush | 123/122 AC |
| 1,933,648 | 11/1933 | Yoder | 261/28 |
| 2,283,694 | 5/1942 | Perrine | 261/DIG. 51 |
| 3,139,874 | 7/1964 | Krein | 261/145 |
| 3,868,822 | 3/1975 | Keller | 60/611 |
| 4,077,375 | 3/1978 | Ishikawa | 123/122 AC |
| 4,086,892 | 5/1978 | Marsee | 123/122 AC |

*Primary Examiner*—Ronald H. Lazarus
*Attorney, Agent, or Firm*—Fred N. Schwend

[57] ABSTRACT

The usual relatively long induction passage connecting the compressor of a supercharger between the carburetor and the intake manifold of an internal combustion engine is bypassed during idling condition by a relatively small idle mixture transfer passage which directs the idling fuel/air mixture directly against a heated section of the intake manifold, thereby preventing precipitation of the fuel during idling. An opening between a part of the induction passage upstream from the compressor and a portion thereof downstream from the compressor limits the boost pressure developed by the compressor to a predetermined upper limit.

4 Claims, 4 Drawing Figures

FUEL/AIR MIXTURE CONTROL FOR SUPERCHARGED INTERNAL COMBUSTION ENGINES

BACKGROUND OF THE INVENTION

1. Field of the Invention

This invention relates to means for controlling the fuel/air mixture for an internal combustion engine and has particular reference to means for improving the performance of a supercharged engine from an idling condition to a high speed condition.

2. Description of the Prior Art

It is well known that superchargers are very effective in increasing the power of an internal combustion engine. Therefore, smaller engines having superchargers associated therewith can do work previously requiring much larger, heavier and more expensive engines. However, there are certain drawbacks which have heretofore discouraged widespread use of superchargers for engines which are primarily used to power automobile, boat and similar engines wherein the speed of the engine must be often varied between idling and high speed. Among such drawbacks is the fact that when the supercharger is connected to draw an air/fuel mixture from the carburetor and to force the same through the intake manifold of the engine, the mixture must travel over a relatively long distance. During such travel, when the engine is idling and the fuel/air mixture is moving at a low velocity, the fuel, such as gasoline, tends to precipitate out of the mixture in liquid form and to collect on the walls of the induction duct work or conduit. This is augmented by the fact that a relatively high vacuum exists in the induction conduit during idling, thus lowering the temperature of the mixture. Such fuel drop-out tends to cause erratic idling operation and also, when the engine is accelerated from idling condition, the accumulated liquid fuel is picked up by the air flow, making an over-rich mixture which again tends to cause erratic operation during the transition from idling speed to normal or high speed.

Heretofore, attempts to correct the above condition comprised, for example, providing a special pump and conduit to pick up the collected liquid fuel and to introduce the same into the intake manifold (see the U.S. Pat. No. 3,910,849 to R. J. Lloyd). Another solution has been to provide means for heating the mixture during its travel from the carburetor to the inlet of the supercharger compressor. However, since the mixture is later further heated by compression as it leaves the compressor on its way to the intake manifold, the overall rise in temperature of the mixture reaches a level where it tends to cause dangerous heating and detonating effects with consequent loss of power and internal damage when introduced into the combustion chambers of the engine. In order to overcome the latter condition, air coolers, as disclosed in the U.S. Pat. No. 2,292,233 to A. Lysholm, have been employed to cool the mixture prior to entry into the intake manifold. Although such coolers are usually satisfactory, they present added weight, bulk, complexity and cost.

The foregoing problems have been recognized heretofore and efforts to shorten the path of delivery of the fuel/air mixture between the carburetor and the intake manifold during idling conditions have been attempted. For example, in the U.S. Pat. No. 3,868,822 to R. A. Keller, a relatively short induction conduit is provided between the carburetor and the intake manifold, with a floating one-way valve therein, and with the supercharger compressor inlet connected upstream from the valve and the compressor outlet connected downstream from the valve. Although this arrangement is generally satisfactory, the valve is subject to fluttering due to rapid changes in air pressure, tending to cause excessive wear and damage to the valve and possible ingestion into the engine.

An additional problem encountered in the association of superchargers, particularly turbochargers, with internal combustion engines is the fact that at higher speeds the supercharger compressor tends to supply more pressurized air than is required for proper operation, thus abnormally raising the boost pressure. Generally, this has been corrected in a turbocharger by the incorporation of a waste gate valve in the turbine drive circuit which automatically opens when the pressure exceeds a predetermined amount. Since the waste gate valve is in the path of the relatively hot and corrosive exhaust gasses, it is subject to malfunction and deterioration.

SUMMARY OF THE INVENTION

Accordingly, a principal object of the present invention is to provide a fuel/air mixture control system for an internal combustion engine which overcomes the above noted problems.

Another object of the invention is to provide a fuel/air mixture control system which enables proper idling of an engine equipped with supercharging system.

Another object is to provide a fuel/air mixture control system of the above type which enables a smooth transition of power when changing from an idling condition to a high speed condition.

Another object is to provide an improved fuel/air mixture control system of the above type which obviates the need for any valves or other moving parts in the induction passage.

According to the present invention, the compressor of a supercharger, typically a turbocharger, is installed in the relatively long induction passage between the throat of the carburetor and the intake manifold. Means are provided to heat a small section of the induction passage, preferably a portion of the intake manifold. A relatively small diameter transfer passage is provided with its entrance end located adjacent the idling jet of the carburetor and its exit end located adjacent the heated section of the induction passage. During idling conditions, the supercharger is essentially ineffective and the relatively high vacuum established by the pistons, draws the idling mixture directly through the transfer passage and against the heater section, thereby not only providing a shorter path to prevent precipitation of the fuel but also heating the mixture to further maintain the same in vapor form whereby to enhance idling operation of the engine and enable a smooth transition from idling to high speed operation. When the carburetor control valve is opened to increase the engine speed by passing air past a high speed fuel jet, the resulting fuel/air mixture is drawn by the natural aspirating action of the engine through the intake manifold to the cylinders. As the engine speed further increases, the supercharger becomes effective to apply a positive boost pressure to the intake manifold thereby providing further power.

According to another aspect of the invention, a small bypass opening is provided between a pair of the induction conduit upstream from the supercharger compressor and a part of such conduit downstream from the compressor. As the boost pressure increases to a predetermined amount determined by the size of the bypass opening, more and more fuel/air mixture is bypassed through the bypass opening to thus limit the boost pressure to such predetermined value regardless of any subsequent increase in engine speed.

BRIEF DESCRIPTION OF THE DRAWINGS

The manner in which the above and other objects of the invention are accomplished will be readily understood on reference to the following specification when read in conjunction with the accompanying drawings, wherein.

DESCRIPTION OF THE PREFERRED EMBODIMENT

Figure 1:
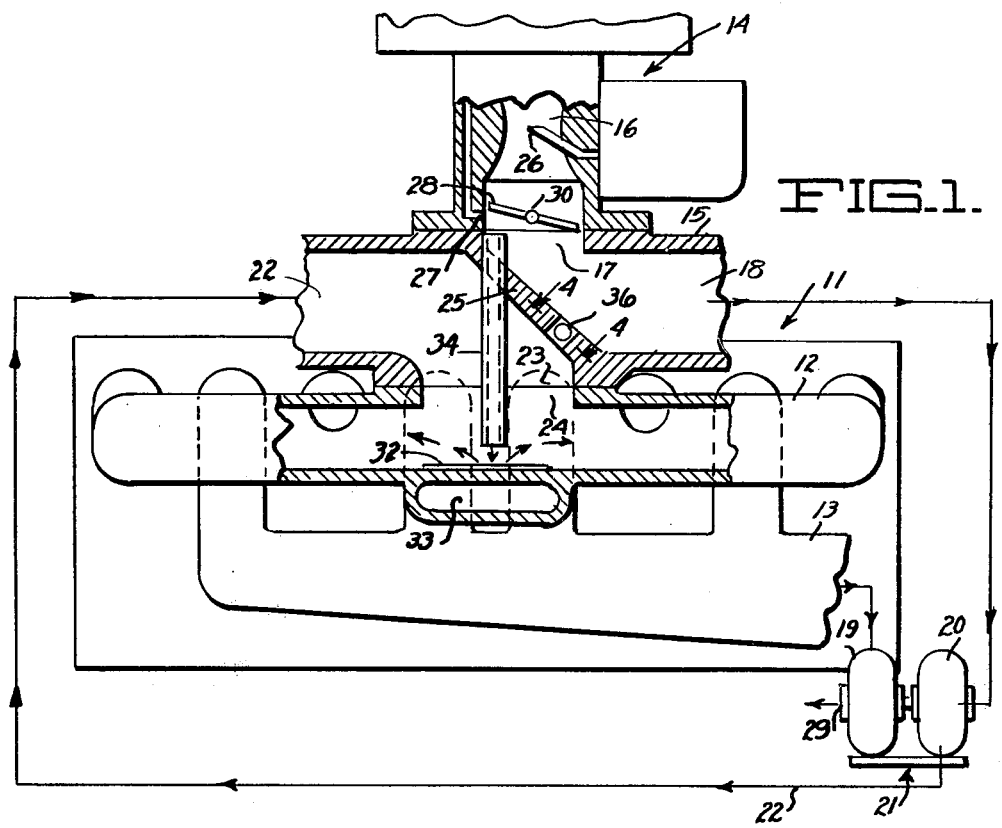
FIG. 1 is a schematic side view of a turbocharged engine embodying a preferred form of the present invention and showing the engine in an idling or low speed condition.

Although the invention is susceptible to embodiment in many different forms, there is shown in the drawings and will be described in detail one specific embodiment, with the understanding that the present disclosure is to be considered as an exemplification of the principles of the invention and is not intended to limit the invention to the embodiment illustrated.

Referring to the drawing, a gasoline driven internal combustion engine is generally indicated at 11, having an intake manifold 12 and an exhaust manifold 13. A downdraft carburetor 14 of conventional construction is mounted on a hollow induction casing 15 with its throat 16 communicating with the inlet 17 of a fuel/air mixture induction conduit 18 forming the induction passage. The latter conduit is connected to the inlet of the centrifugal compressor 20 of a turbocharger generally indicated at 21. The outlet of compressor 20 is connected by an induction conduit 22 to the casing 15 and communicates through an outlet opening 23 with the inlet opening 24 of the intake manifold 12. A substantially diagonally extending wall 25 is formed in the casing 15 to separate the inlet passage of conduit 18 from the outlet passage of conduit 22. Exhaust gases expelled through the exhaust manifold 13 drive the turbine 19 of the turbocharger 21 and are then conducted through an exhaust outlet 29 to the atmosphere.

The carburetor 14 is shown as having a single throat or air horn 16 in which a high speed fuel jet 26 is mounted. An idling or low speed fuel jet 27 is formed in the lower end of the carburetor wall forming throat 16 and opens into the throat.

The speed of the engine is basically controlled by a butterfly type valve 28 which is pivotally supported at 30 and is adjustable to different angular positions by the engine operator. When the valve 28 is in its closed position illustrated in FIG. 1, it substantially closes the throat 16 above the idling jet 27 so that only an idling fuel/air mixture emanates from the vicinity of such idling jet to sustain an idling or low speed operation of the engine.

It should be noted that although the carburetor 14 is disclosed as having only a single throat 16 and a single idling jet 27, it may also include any number of additional throats with any number of high speed jets and idling jets associated therewith, all such throats communicating with the inlet passage 17 of casing 15.

A section 32 of the intake manifold 12 directly below the intake opening 23 thereof is preferably heated by exhaust gases suitably bypassed from the exhaust manifold 13 and passed through a passage 33 formed in the bottom of the intake manifold 12. Alternatively, an electrically operated heater element, not shown, could be mounted over the manifold section 32.

According to the present invention, a fuel/air mixture transfer tube 34 extends vertically in a straight line through the wall 25 of the casing 15 with its upper entrance end located directly below but spaced somewhat from the idling jet 27 and with its exit end located directly above but spaced slightly from the heated section 32 of the intake manifold wall.

When the engine is operating at idling speed in its condition shown in FIG. 1 the turbocharger 21 is substantially ineffective and the relatively high vacuum in the intake manifold 12 caused by the pistons of the engine 11 draws the fuel/air mixture mainly directly from the idling jet 27, through the tube 34, and it is directed against the heated manifold section 32. Since the idling fuel/air mixture is now heated and need only pass through a relatively short distance to the engine cylinders, little, if any, fuel will precipitate from the mixture. At such idling or slow engine speeds, the resulting small amount of heat introduced into the cylinders due to heating of the fuel/air mixture as it passes over the manifold section 32 will have no or little detrimental effect. In practice it is found that a tube 34 having an internal diameter of approximately 4.7 mm or a cross sectional area of approximately 17.34 sq. mm and in any event, having an internal cross sectional area less than ¼ the cross sectional area of the passage 17, works satisfactorily. Since the tube 34 is straight and disposed vertically, any fuel which may precipitate from the fuel/air mixture passing downwardly therethrough will strike the heated surface 32 and thus will again be vaporized.

In cases where two or more idling jets, i.e. 27, are provided, corresponding mixture transfer tubes, similar to tube 34, are also preferably provided.

Figure 2:
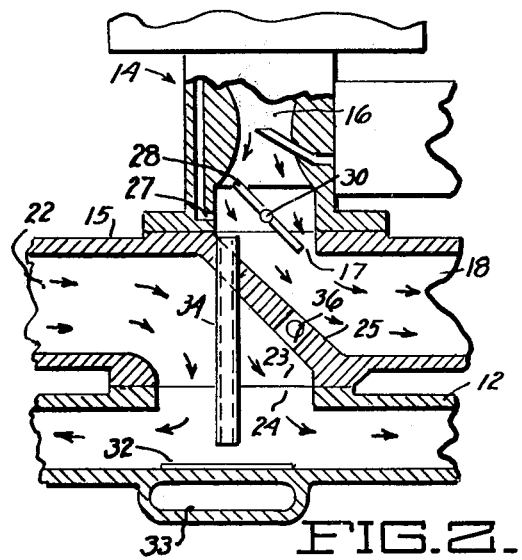
FIG. 2 is a schematic view similar to FIG. 1 but with parts broken away and showing the engine in an aspirating or intermediate speed condition.

When the valve 28 is opened to an intermediate range position, such as shown in FIG. 2, the engine increases in speed to an intermediate speed range of, for example, between 600 and 3500 rpm. At such intermediate speeds, the turbocharger compressor still produces a very small amount of boost pressure and therefore the engine operates in a normal aspirated condition wherein the pistons draw the fuel/air mixture through the carburetor and through the induction conduits 18 and 22, past the compressor 20 and into the intake manifold. A small amount of fuel/air mixture may be drawn through the tube 34 but it is inconsequential.

Figure 3:
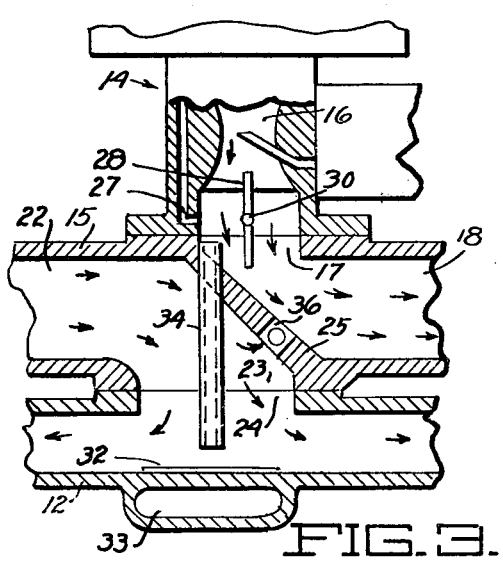
FIG. 3 is a schematic view similar to FIG. 2, showing the engine in a turbocharged or high speed condition.

When the valve 28 is opened beyond its intermediate range position, as shown, for example, in FIG. 3, the further increase in engine speed causes the turbocharger compressor 20 to become effective to materially boost the fuel/air mixture pressure in the intake manifold 12 and thus increase the power of the engine. At this time, the pressure differential between the inlet and outlet passages 17 and 23 of the casing 15 causes only a small amount of the fuel/air mixture to move through the tube 34 and to recirculate into the passage of conduit 18.

Figure 4:
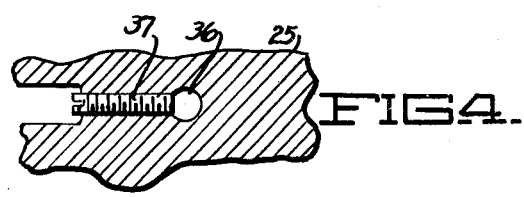
FIG. 4 is a sectional plan view taken along the line 4—4 of FIG. 1.

Further, according to another aspect of the present invention, a bypass opening 36 (see also FIG. 4) is formed in the wall 25. The size of the latter opening may be adjusted by an adjustment screw 37. The opening 36 is relatively small, being on the order of 8 mm in diameter when fully open. Accordingly, due to normal pressure differential between the inlet and outlet openings 17 and 23 in the casing 15, a small amount of fuel/air mixture will be recirculated in the opening 36. However, as the boost pressure created by the turbocharger compressor 20 approaches a maximum desired amount, for example, 7 lbs. per sq. in. or 0.49 kg per sq. cm, a proportionally greater amount of air/fuel mixture will be bypassed through the opening 36 thereby limiting the boost pressure applied to the inlet manifold. Adjustment of the screw 37 will, of course, result in regulating the maximum boost pressure. A small amount of recirculation of the fuel/air mixture is also effected through the transfer tube 34 although this is restricted due to the small diameter and length of such tube.

From the foregoing, it will be observed that numerous variations and modifications may be effected without departing from the true spirit and scope of the novel concept of the invention. It is, of course, intended to cover all modifications as fall within the scope of the appended claims.

I claim:

1. In combination with an internal combustion engine having a fuel/air induction conduit means,
    said conduit means including an intake manifold at one end thereof,
    means in said conduit means forming a source of heat,
    a carburetor at the opposite end of said conduit means,
    said carburetor having an idle speed device for supplying an idle-speed fuel/air mixture, a high-speed device for supplying a high-speed fuel/air mixture, and valve means for selectively causing operation of said idle-speed device and said high-speed device;
    of a casing intermediate said carburetor and said intake manifold,
    the fuel/air mixture entrance end of said conduit means extending into said casing and communicating with said carburetor,
    the fuel/air mixture exit end of said conduit means extending into said casing and communicating with said intake manifold,
    said casing forming a partition intermediate said entrance and said exit ends of said conduit means,
    supercharging means connected in said conduit means, and
    means forming a transfer passage extending through said partition,
    said transfer passage having an entrance end adjacent said idle-speed device and an exit end adjacent said heat source for directing said idle-speed fuel/air mixture against said hear source when said valve means causes said idle-speed device to supply said idle-speed air/fuel mixture.

2. The combination as defined in claim 1 wherein said transfer passage extends linearly and vertically.

3. The combination as defined in claim 1 wherein said transfer passage extends vertically,
    said entrance end of said transfer passage being located below said idle-speed device and said exit end of said transfer passage being located over said heat source.

4. The combination as defined in claim 2 wherein the cross-sectional area of said transfer passage is less than one fourth the internal cross-sectional area of said conduit means.

* * * * *